(12) United States Patent
Watkins

(10) Patent No.: US 11,836,479 B2
(45) Date of Patent: Dec. 5, 2023

(54) MIMIC COMPONENTS FOR DEPLOYING EXPERIMENTAL WEBPAGE FEATURES

(71) Applicant: Microsoft Technology Licensing, LLC, Redmond, WA (US)

(72) Inventor: Justin James Watkins, South Newfane, VT (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/678,166

(22) Filed: Feb. 23, 2022

(65) Prior Publication Data

US 2023/0266959 A1 Aug. 24, 2023

(51) Int. Cl.
| | |
|---|---|
| *G06F 11/07* | (2006.01) |
| *G06F 11/32* | (2006.01) |
| *G06F 11/36* | (2006.01) |
| *G06F 8/65* | (2018.01) |
| *G06F 8/71* | (2018.01) |
| *G06F 9/451* | (2018.01) |
| *G06F 9/445* | (2018.01) |

(52) U.S. Cl.
CPC ............... *G06F 8/65* (2013.01); *G06F 8/71* (2013.01); *G06F 9/451* (2018.02); *G06F 9/44536* (2013.01)

(58) Field of Classification Search
CPC ... G06F 8/65; G06F 8/71; G06F 9/451; G06F 9/44536
See application file for complete search history.

(56) References Cited

U.S. PATENT DOCUMENTS

| | | |
|---|---|---|
| 8,543,645 B1 | 9/2013 | Lloyd et al. |
| 11,216,292 B2 | 1/2022 | Accame et al. |
| 2014/0201618 A1 | 7/2014 | Hansmann et al. |
| 2020/0364742 A1 | 11/2020 | Chelliah et al. |
| 2021/0081309 A1* | 3/2021 | Golubev ............. G06F 11/0772 |
| 2021/0397541 A1 | 12/2021 | Mordo et al. |
| 2023/0061640 A1* | 3/2023 | Chandraguptharajah ..................... G06F 11/3692 |

OTHER PUBLICATIONS

Willian Massami Watanabe et al., Using Acceptance Tests to Validate Accessibility Requirements in RIA, Apr. 16-17, 2012, [Retrieved on May 15, 2023], Retrieved from the internet: <URL: https://dl.acm.org/doi/pdf/10.1145/2207016.2207022> 10 Pages (1-10) (Year: 2012).*

Simon, Jean-Yves, "Drive Digital Transformation With Client-Side and Server-Side Experience Optimization", Retrieved from: https://www.flagship.io/client-server-side-experiments/, May 12, 2020, 6 Pages.

* cited by examiner

*Primary Examiner* — Anibal Rivera
(74) *Attorney, Agent, or Firm* — Holzer Patel Drennan

(57) ABSTRACT

A technique for deploying an experimental version of a webpage includes using a mimic component to emulate functionality of a corresponding hidden UI component. The technique provides for receiving user input at the mimic component and, in response to the user input, executing a functional code block that bidirectionally communicates with an underlying platform code to update state data of the hidden UI component. The technique further provides for detecting, at the mimic component, an update to the state data of the hidden UI component, in response to the detection, updating state data of the mimic component based on the updated state data of the hidden UI component.

20 Claims, 7 Drawing Sheets

MIMIC COMPONENTS FOR DEPLOYING EXPERIMENTAL WEBPAGE FEATURES

BACKGROUND

For various reasons, web development teams may be motivated to deploy different versions of a website on different user devices. For example, a web development team may want to test different user interface (UI) features on different user machines and collect data on the resulting user experiences. Some changes to UI content may have the effect of increasing the user's enjoyment or ease of interaction with the content served by the webpage; other changes may have the opposite effect.

SUMMARY

Figure 1:
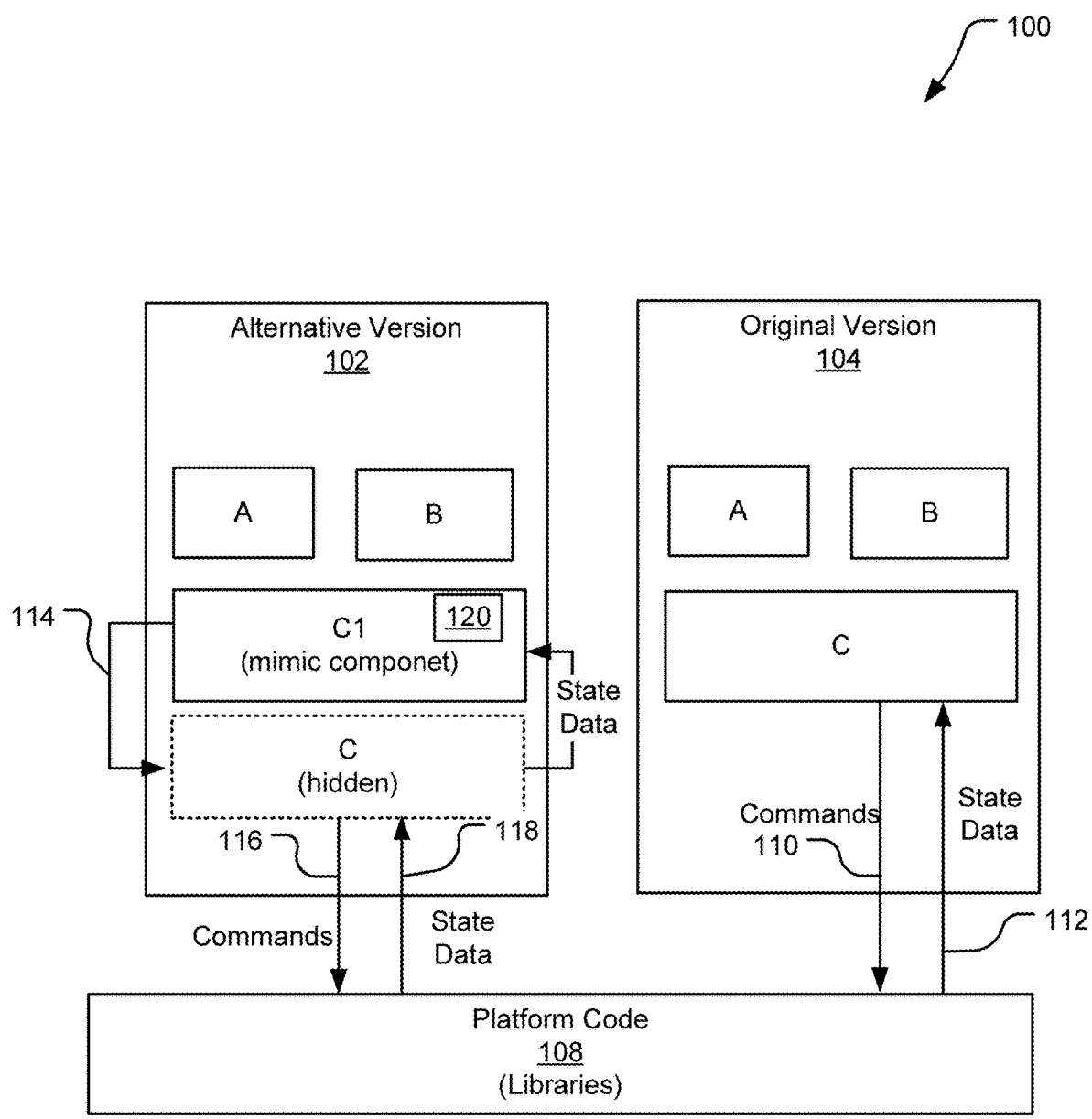
FIG. 1 illustrates an exemplary system that deploys different versions of a webpages to different end users, such as for experimental purposes.

A method for deploying an experimental version of a webpage provides for hiding at least one UI component from a user while displaying a mimic component that emulates functionality of the UI component. The method includes receiving user input provided to the mimic component through a web browser window; executing a functional code block that bidirectionally communicates with an underlying platform code to update state data of the hidden UI component; detecting an update to the state data of the hidden UI component; and responsive to the detection of the update to the state data of the hidden UI component, updating state data of the mimic component based on the updated state data of the hidden UI component.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Webpages are often built to interact with platform code of a specific development suite that includes libraries supporting extensive and/or complex functionality. There are two primary approaches to deploying alternative versions of a website, with one or more different user interface (UI) components, for experimentation. Under a first approach, different versions of the website (or UI component on the website) are written independently, each invoking the desired features and functionality of the same underlying platform code. This approach is costly in terms of developer time, as each different version may typically undergo a full development life cycle (e.g., 2-3 months prior to deployment).

Under a second approach, an alternative web experience is created by injecting experimentation code into the original version of the webpage. For example, the experimentation code may sit on top of the platform code and inject test UI components that overwrite corresponding UI components in the original website version. One problem with this approach arises from the fact that UI components frequently re-render in some development platforms. When this re-rendering occurs, the injected test UI components are incidentally wiped out by original version. To ensure that the re-rendering does not revert the webpage back to the original version, the original UI component may be continuously monitored for changes, and each detected change may cause the corresponding injected test UI component to re-execute its own functional code and re-render, thus repeatedly overwriting the corresponding re-rendered original UI component. This approach is costly in terms of performance and the repeated injection of the test elements can cause undesirable visual effects such as flickering of UI components. Moreover, this injection technique lacks robusticity since the test UI components may be developed quickly and without being subjected to a full development/testing life cycle. Consequently, minor changes in the underlying platform code may have a high likelihood of crashing the alternative version of the website with the test UI components.

The herein disclosed technology provides a development technique that may allow quick deployment of a robust alternative version of a website or UI component, such as for experimentation purposes. According to one implementation, an alternative version of a website includes one or more UI components that are selectively hidden when the webpage is rendered to a display. These selectively hidden UI components are each replaced by a corresponding test UI component. These test UI components are referred to herein as "mimic components" because each mimic component in some way mimics the functionality of one or more of the selectively hidden UI components.

Each mimic component is a state-based component, and the hidden UI components are also state-based. A "state-based" component is a component that stores and manages state data that is subject to changing (updating) in time, such as in response to user inputs. For example, a state-based component may be a radio button that is visually rendered as an open circle when in a first (e.g., selected) state and visually rendered as a filled circle when in a second (e.g., selected) state. Likewise, a state-based component may be a shopping cart object with an associated graphic that displays certain state information, such as items and prices that change as the user updates items that have been added to the shopping cart.

According to one implementation, an experimental version of a webpage includes all or substantially all state-based UI components of an original version. However, one or more of the state-based UI components is toggled into a mode such that the component is "hidden" to the user in the sense that the component is not rendered to the display when the user is viewing the webpage. Each mimic component is defined in association with at least one of the hidden UI component such that user input to a mimic component triggers execution of functional code defined within with the corresponding hidden UI component. For example, a click on a mimic component may "spoof" a click on one of the hidden UI components such that functional code of the hidden UI component is executed, thereby initiating an update to the state data of the hidden UI component. Each mimic component maintains its own state based on the state of the hidden UI component. When the state of the hidden UI component updates, the associated mimic component re-populates its own state data by pulling from the state data of the hidden UI component.

Although the hidden UI components can re-render many time over, the user is unaware of the re-rendering because the hidden UI components are not rendered to the user display. Thus, there are no undesired "flickering" effects as described above with respect to injection of experimental UI component under a more traditional approach to website experimentation. Moreover, this solution is far more robust than the above-described experimental injection technique due to the fact that the mimic components populate their own state data based on the state data of the corresponding hidden UI elements. Consequently, a mimic component may maintain a consistent look and feel to the user while allowing the more robust (well-tested) corresponding hidden UI component to execute all or substantially all of the functional code that provides the component's functionality. Further advantages and details are apparent from the following figures.

While the following description and examples are focused on improving webpage UI development, the techniques disclosed herein could also be used to improve the development of other interactive application UI.

FIG. 1 illustrates an exemplary system that deploys different versions 102, 104 of a webpage 100 to different end users. The webpage 100 is interactive in the sense that it is designed to receive user inputs and execute code in response to such inputs to serve the user with designated functionality. The webpage 100 includes code (e.g., an HTML file) that defines various UI elements. Some of the UI elements further include function calls to various libraries within underlying platform code 108 that provides the website with a set of features selected by a web developer. A processor (not shown) executes a web browser application, and the web browser application executes the code blocks within the HTML file to render the webpage 100 to a user display.

In an implementation, both versions 102, 104 of the webpage 100 are available at a same domain. Some users that navigate to the domain are presented with an original version 104 while other users that navigate to the domain are presented with an alternative version 102. The set of users selected to be presented with the alternative version 102 of the webpage 100 may be selected based on a variety of factors considered external to the scope of this disclosure such as location (IP address), user profile data, browsing history, or other information.

The webpage 100 includes various state-based UI components, shown as A, B, and C. Each of the state-based UI components is defined in the webpage HTML file as a state-based data object. In this example, component C is visible in the original version 104 but hidden in the alternative version 102. Component C is interactive in the sense that the web browser executes certain functions in response to receipt of user input acting on component C. For example, component C may include a selectable field such as a submit button that, when clicked, captures certain data that is added to or otherwise used to update the state of the data object corresponding to component C. In some implementations, state-based UI components, such as component C, may additionally include one or more non-interactive subcomponents such as text and images that are displayed but not configured to execute functions responsive to user input.

The original version 104 of the website includes code that is executed by the web browser application responsive to user interactions provided to the state-based UI components A, B, C. For example, a user interaction with component C initiates bidirectional communications between component C and the platform code 108. The platform code 108 may be generally understood as including a collection of libraries defining functions accessible to the webpage and/or APIs for interfacing with applications external to the web browser application. Example platform codes include Meta's React Google's AngularJS®, or Blue Spire's Aurelia.

When a user provides input to one of the state-based UI components A, B, or C, the web browser executes functional code of the component, causing an update to the state data within the component. For example, the original version 104 of the website illustrates an exchange of data that occurs when a user provides input to Component C. Here, the user input triggers execution of functional code defined in association with component C. Executing this codes causes one or more commands 110 (e.g., functions calls) to be transmitted from the webpage to the platform code 108. In response, the platform code executes the received commands and returns state data 112 to the web browser application, which in turn stores the state data 112 in association with component C.

In FIG. 1, the alternative version 102 of the webpage includes the same state-based UI components (A, B, and C) as the original version 104 but differs in that one of these components—component C—is hidden and a mimic component C1 is included to serve the user with the functionality of the hidden UI component. In one implementation, the code defining components A, B, and C is identical or substantially identical in the two different website versions; however, component C includes a tag or other setting that causes it to be displayed in the original version 104 and selectively hidden (not rendered to the user display) in the alternative version 102 of the webpage 100. Consequently, a user interacting with the alternate version 102 of the webpage 100 may not be aware (without viewing the HTML code) that component C exists. For this reason, component C is referred to below as "hidden component C" with respect to the alternative version 102 of the webpage 100.

In addition to the above, the alternative version 102 of the webpage 100 further differs from the original version 104 in that it includes a mimic component C1 that is designed to emulate some or all of the behavior of the corresponding hidden component C. Like the UI components A, B, and C, the mimic component C1 is also state-based UI component configured to receive user input provided through to a window of the web browsing application displaying the alternative version 102 of the webpage 100. For example, the mimic component C1 may include a text entry field, one or more selectable options, and/or buttons (e.g., a submit button). User input to the mimic component C1 triggers actions of the web browsing application that are effective to update the state data of the hidden component C.

In one implementation, a user interaction with (e.g., click on) the mimic component C1 simulates a user interaction with the hidden component C. For example, the code defining the mimic component C1 may instruct the web browsing application to interpret a click on the mimic component as, instead, a click on the hidden UI component.

In this way, a click on the mimic component C1 may trigger execution of functional code defined with respect to the hidden component C. When the functional code of the hidden component C is executed, one or more commands 116 are transmitted to the underlying platform code 108. Execution of these commands 116 updates state data 118 of the hidden component C, which is then returned to the web browsing application and stored within the data object corresponding to hidden component C.

In FIG. 1, the mimic component C1 includes an observer 120 (e.g., module) instantiated by the mimic component that continuously monitors the state of the corresponding hidden UI component (hidden component C). When the observer 120 detects that state data of the hidden component C has been updated, the observer 120 triggers execution of further code within the mimic component C1 that, in turn, updates the state data of the mimic component C1 based on the newly-updated state of the hidden component C. For example, the mimic component C1 may pull the updated state data from the hidden component C into itself and/or otherwise update its own state based on this pulled data.

In a simple example of FIG. 1, it may be imagined that component C is a UI component that includes text and a button. When component C is displayed in the original version 104 of the website, the text is presented according to a first style (e.g., a small font size and first color). The mimic component C1 emulates the functionality provided by original component C but differs in that it presents the text and/or other visual attributes according to a different style. The mimic component C1 is defined such that any user input it receives triggers execution of functional code of the corresponding hidden component (hidden component C). In this sense, the mimic component C1 can store state data that is identical to or based on state data of the hidden component C but present such data according to an independently-defined look and feel, all without self-computing, retrieving, or otherwise performing any actions to generate the state data. Consequently, state data of each mimic component is updated by the same robust code that controls state data updates to the corresponding hidden component in the original version 104 of the webpage.

Figure 2A:
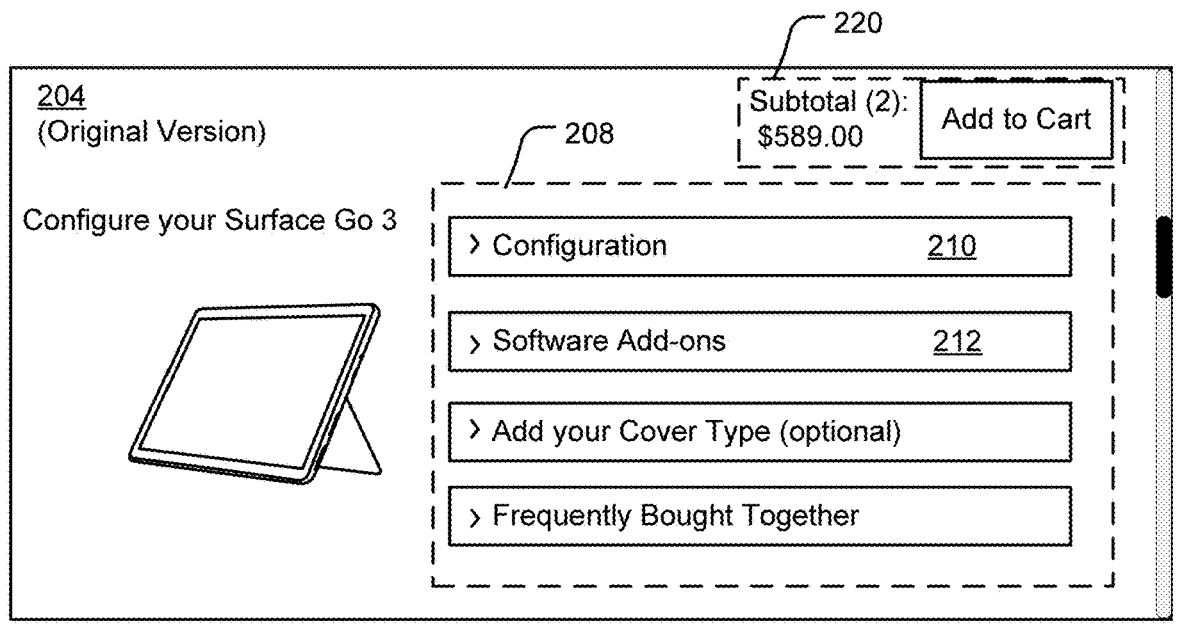
FIG. 2A illustrates aspects of a system that uses mimic components to deploy experimental webpage features.

FIG. 2A illustrates aspects of a system that uses mimic components to deploy different versions (202, 204) of a webpage 200. According to one implementation, an alternative version 202 of the webpage 200 includes certain test components ("mimic components") that emulate behavior of corresponding components rendered in an original version 204 of the website. The use of mimic components as described below shortens the development time needed to deploy the alternative version 202 without decreasing the robusticity of webpage code as compared to the original version 204.

In FIG. 2A, the original version 204 of the webpage 200 includes an accordion-style UI component 208 that includes a number of options that, when clicked, expand to present associated information (e.g., additional selectable options). For example, when the user clicks on a configuration option 210, a drop-down menu presents the user with certain selectable hardware configurations for a product; when the user clicks a software add-on option 212, a drop-down menu presents the user with software packages that can be purchased along with the product, etc.

The accordion-style UI component 208 is defined in the HTML, of the webpage as a state-based data object that maintains and stores state-based data. As the user selects options to "build" the product package that he or she wishes to purchase, the state data of this data object is updated to store the user-selected options.

The original version 204 of the webpage 200 further includes a virtual shopping cart UI component 220 (e.g., an interactive UI element that is also defined as a state-based object) that displays a current total price of the options selected. The virtual shopping cart UI component 220 includes a button (e.g., "add to cart") that, when clicked, adds the currently selected product and product options to a virtual shopping cart, thereby updating the state data of the virtual shopping cart UI component 220.

In contrast to the original version 204 of the webpage 200, the alternative version 202 of the webpage 200 does not display the accordion-style UI component 208 and the virtual shopping cart UI component 220. Notably, the data objects corresponding to the accordion-style UI component 208 and the virtual shopping cart UI component 220 are still included in the HTML file that is read by a web browser to present the alternative version 202. However, these data objects include tags that cause the corresponding visual features to be hidden from the user when the alternative version 202 is rendered to a user display. While the accordion-style UI component 208 and the virtual shopping cart UI component 220 are hidden, a first mimic component 214 and a second mimic component 216 are rendered to the user's display within the window of the web browser application.

The first mimic component 214 is designed to emulate the functionality of the accordion-style UI component 208 while providing the user with interface controls that have a different look and feel. When the user interacts with the first mimic component 214, inputs are provided to the accordion-style UI component 208, which is hidden from the user interface. Thus, the user is effectively interacting with the accordion-style UI component 208 without knowing it. Here, a user click on a configuration radio button 222 in the mimic component 214 triggers execution of functional code defined in association with the configuration option 210 in the accordion-style UI component 208. For example, clicking on the configuration radio button 222 executes a line of code that simulates (e.g., spoofs) a click on the configuration option 210, which in turn triggers execution of functional elements defined with respect to the accordion-style UI component 208. The execution of these functional elements may have the effect of updating state data of the accordion-style UI component 208.

The second mimic component 216 is designed to emulate the functionality provided by the virtual shopping cart UI component 220 while changing the look and feel of the virtual check out experience as compared to the original version 204 of the webpage 200. When aspects of the second mimic component 216 are rendered (as shown) in the alternative version 202 of the webpage 200, some of the data presented is different in content and/or in form than that is presented when the virtual shopping cart UI component 220 is rendered in the original version 204. In one implementation, the rendered aspects of the second mimic component 216 are generated based on state data that is that is pulled from (e.g., copied out of) the virtual shopping cart UI component 220.

When the user interacts with the second mimic component 216, inputs are provided to the corresponding hidden component (the virtual shopping cart UI component 220). Thus, the user effectively interfaces with the virtual shopping cart UI component 220 through the second mimic component 216. For example, when the user clicks "continue to add-ons" within the second mimic component 216, this adds the currently selected product options from the "configuration" menu to a virtual shopping cart, thereby updating the state of the virtual shopping cart UI component 220. The user's addition of further products or product options to the virtual shopping cart may trigger execution of additional functional code defined with respect to the virtual shopping cart UI component 220. For example, a user click on the second mimic component 216 may cause the virtual shopping cart UI component 220 to execute a code block that updates the cart subtotal. The second mimic component 216 can, in turn, update itself by pulling this state data out of the virtual shopping cart UI component 220 and copying the pulled state data into its own data structures.

As described above, inputs to a mimic component may, in some implementations, simulate an interaction with (e.g., click on) a corresponding hidden UI component. In other implementations, inputs to a mimic component do not simulate a click on the corresponding hidden UI component but instead trigger execution of code identical or substantially identical to that defined within the hidden UI component. For example, a mimic component may include executable lines of code identical in function and/or format to code included within the corresponding hidden UI component such that execution of either version of the code causes an update to the state data of the hidden UI component.

In either of the above-described implementations, a user interaction with a mimic component 214 can trigger an update to state data of the corresponding hidden UI component and the mimic component may, in turn, update its own state by pulling from the updated state data of the hidden UI component. An example of this is shown in greater detail below with respect to FIG. 2B.

Figure 2B:
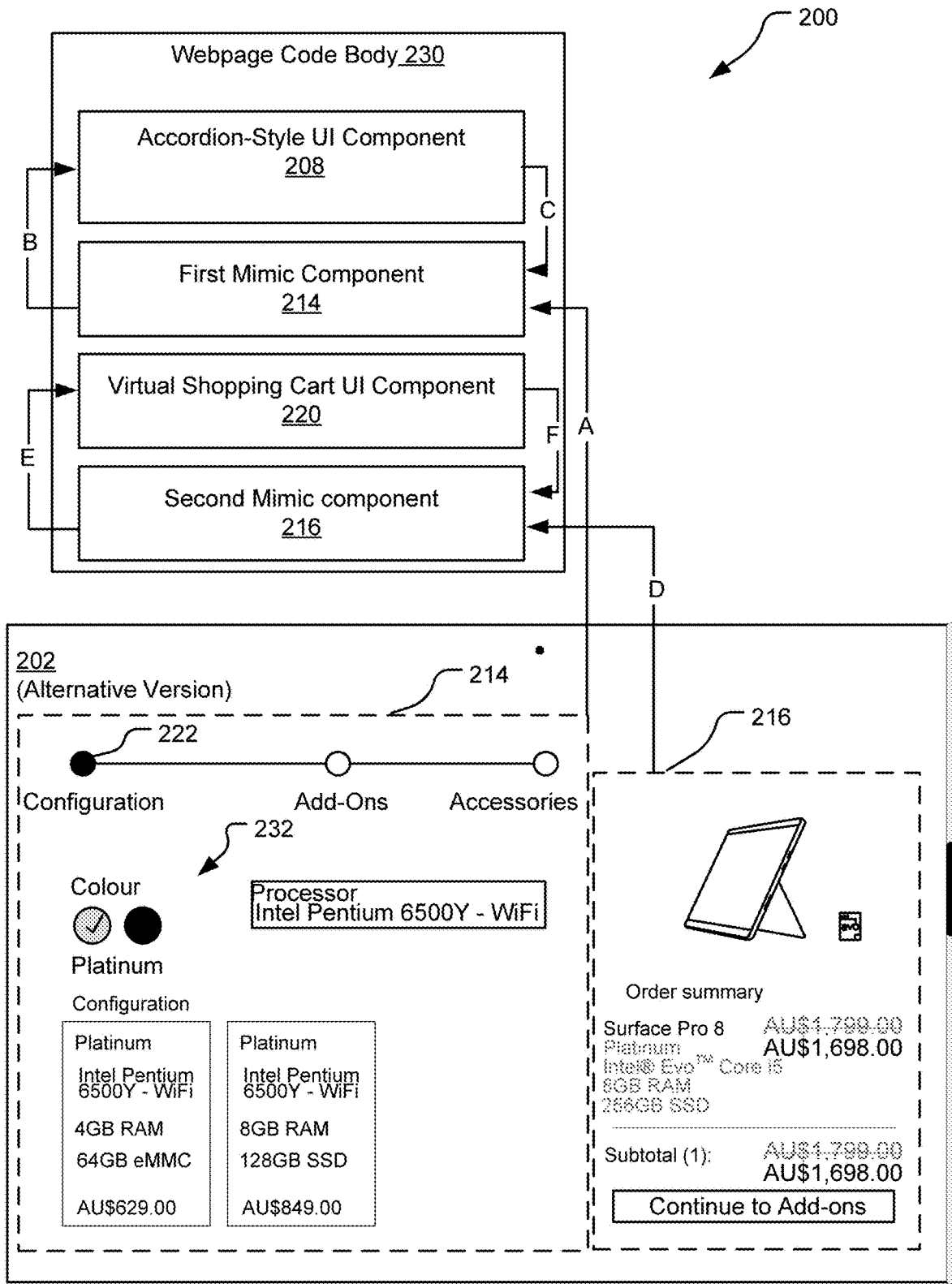
FIG. 2B illustrates actions of the system of FIG. 2A that provide for updating state data of mimic components based on updates to corresponding hidden UI components.

FIG. 2B illustrates actions of the system of FIG. 2A that provide for updating state data of mimic components based on updates to state data of corresponding hidden UI components. A webpage code body 230 represents an exemplary HTML, document readable by a web-browser to present the alternative version 202 of the webpage 200. Various components within the webpage code body 230 invoke calls to functions that are defined within an underlying development platform (not shown).

When a user interacts with the first mimic component 214, these inputs trigger execution of code that is defined within the corresponding data object, as indicated by arrow "A" in FIG. 2B. For example, a click on the configuration radio button 222 executes an event attribute in the mimic component 214 (e.g., onclick=[do something] . . . ) that in turn triggers execution of ab event attribute within the accordion-style UI component 208, as indicated by arrow "B" in FIG. 2B. For example, an "onclick" event attribute of the first mimic component 214 may effectively simulate an input to an "onclick" event attribute defined with respect to the configuration option 210 (visible in FIG. 2A) of the accordion-style UI component 208 that is hidden from the user. In another implementation, a user click on the configuration radio button 222 executes functional code within the mimic component 214 that is identical to code within the accordion-style UI component.

In either scenario described above, the user interaction with the first mimic component 214 triggers transmission of commands to the underlying platform code that are executed to effectively update state data of the accordion-style UI component 208. For example, the updated state data may toggle the status of the configuration option 210 (of FIG. 2A) from "unselected" to "selected," and this selection may, in turn, trigger execution additional platform code components that result in a transmission of state data back to the accordion-style UI component 208.

When the state data of the accordion-style UI component 208 is updated, the first mimic component 214 detects the update and pulls updated state data into itself, as indicated by arrow "C" of FIG. 2B. The first mimic component 214 then re-renders itself based on its updated state data. For example, the first mimic component 214 retrieves option data 232 and presents the option data 232 to the screen simply by copying state data from the accordion-style UI component 208 and without self-executing calls to the underlying platform code.

To further the example of FIG. 2B, user input to the second mimic component 216 triggers execution of functional code defined within the virtual shopping cart UI component 220, as indicated by arrow "D" in FIG. 2B. This functional code in turn triggers execution of function calls to the underlying platform code that are defined inside of the virtual shopping cart UI component 220, which is hidden from the user. For example, a user click on the second mimic component may simulate a click on the virtual shopping cart UI component 220 that, in turn, triggers execution of code within the virtual shopping cart UI component 220 to update internally-stored state data. Alternatively, the second mimic component 216 may directly execute functional code that is identical to that in the virtual shopping cart UI component 220 to update the state data of the virtual shopping cart UI component 220.

When the state of the virtual shopping cart 220 has updated, as described above, the second mimic component 216 detects the update and pulls the new state data from the virtual shopping cart UI component 220 into itself, as indicated by arrow "F" of FIG. 2B. Following this, the second mimic component 216 re-renders itself to display aspects of the newly-acquired state data. For example, the second mimic component 216 copies state data from the virtual shopping cart UI component 220 that includes an updated subtotal and names of items in the virtual shopping cart. The mimic component 216 may present this information even if the functional code responsible for updating the total and cart was executed entirely by the virtual shopping cart UI component 220.

Due to the features described above, the first mimic component 214 and the second mimic component 216 essentially inherit the robust (e.g., fully tested) functionality of the corresponding hidden UI elements while internally managing considerably limited information in comparison that, for example, merely governs how to visual render the inherited state data (e.g., style parameters). Thus, each mimic component can provide a look and feel that is different from the look and feel prescribed for by the corresponding hidden UI component without actually having to execute any calls to the underlying platform code that have not been fully tested with respect to the corresponding hidden UI component and the original version of the webpage 200.

Figure 3:
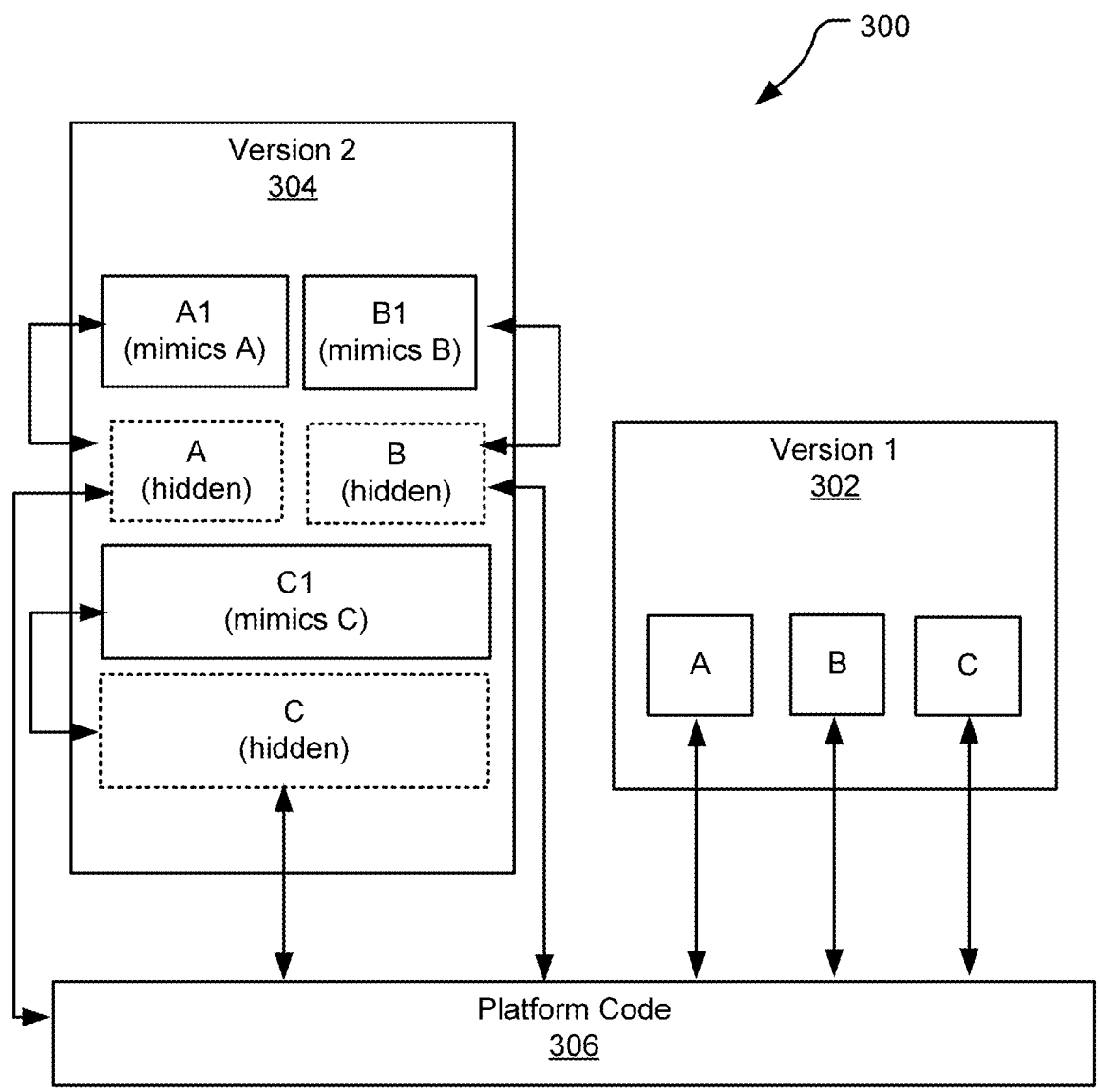
FIG. 3 illustrates another example system that uses mimic components to deploy different version of a website.

FIG. 3 illustrates another example system 300 that uses mimic components to deploy different version of a website. A first version 302 of the website includes three state-based UI components A, B, and C. Each of these components includes a data object adapted to receive user input through a web browser application window and, in response to the user input, execute command calls to an underlying platform code 306. The platform code 306 returns state data, and the state data is received at and stored within the associated state-based UI component (A, B, or C).

A second version 304 of the website includes the same three state-based UI components A, B, and C, but hides all three of these components from the user. The second version 304 includes three mimic components—A1, B1, and C1—each of which are designed to emulate the functionality of an associated one of the components A, B, and C. Thus, the example of FIG. 3 differs from the previous examples presented herein in that none of the UI components in the first version 302 are visible to a user viewing the second version 304. Other functional aspects of the mimic components and corresponding hidden components may be the same or similar to other figures described herein.

In one implementation, a user click on mimic component A1 simulates a click on hidden component A such that functional code elements within component A are executed to transmit commands to the platform code 306 that generate state data that is returned to and stored within hidden component A. The mimic component A1 includes an observer that monitors component A for updates. When the observer detects an update to component A, the mimic component A1 extracts the state data from component A and uses this data to update its own state (e.g., by copying the state data from hidden component A or by computing new data using state data pulled from hidden component A). Mimic components B1 and C1 similarly emulate the functionality of hidden components B and C, respectively.

Other functional aspects of the system 300 not described with respect to FIG. 3 may be presumed the same or similar to other figures described herein.

Figure 4:
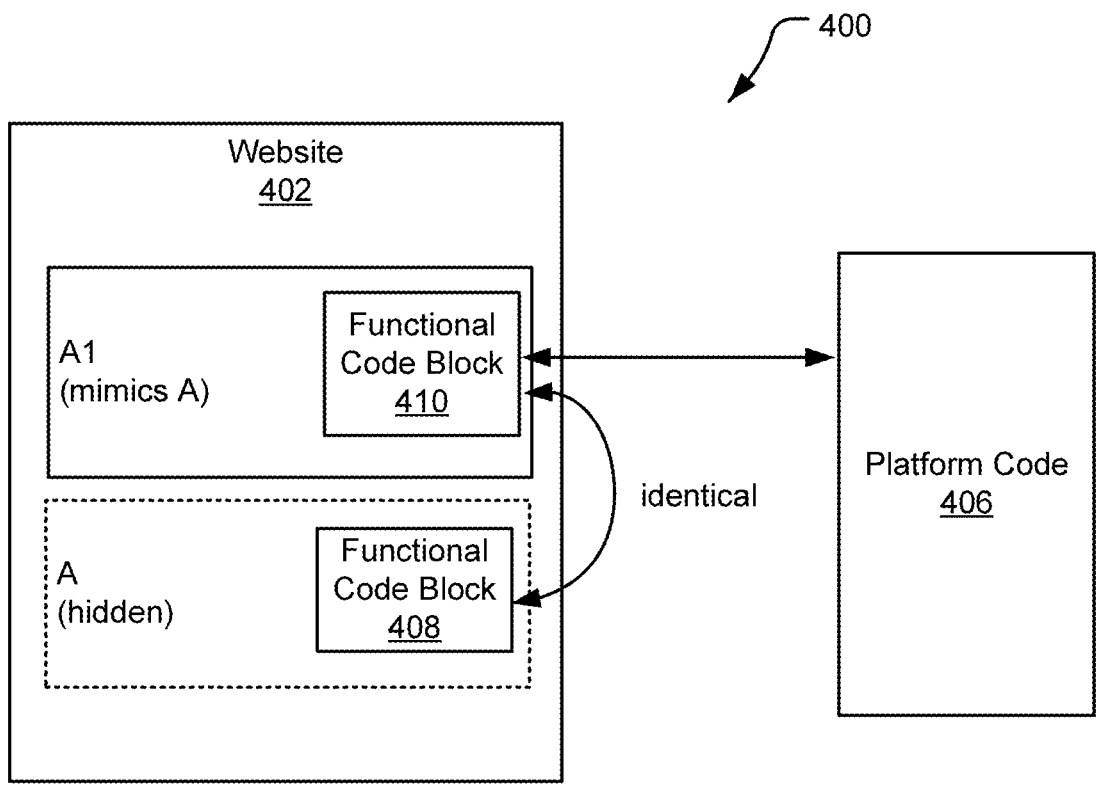
FIG. 4 illustrates still another example system that uses mimic components to deploy an alternative version of a website.

FIG. 4 illustrates still another example system 400 that uses mimic components to deploy an alternative version of a website 402. The website 402 includes a UI component A that is hidden from the user when the website 402 is rendered to user display. The website 402 further includes another UI component A1 that is rendered to a user display while the UI component A is selectively hidden. Both the UI component A and the mimic component A1 are state-based UI components that are configured to receive user input and to execute function calls to an underlying platform code 406.

In the example of FIG. 4, both the mimic component A1 and the corresponding hidden component A have identical functional code blocks 408, 410. This is different from the example of FIG. 3, where each mimic element merely simulates an interaction with a corresponding hidden UI component.

In one implementation, the functional code block 408 of the hidden component A transmits commands to invoke select functions of the underlying platform code 406 that, in turn, execute to update state data of the hidden component A. Likewise, the functional code block 410 of the mimic component A1 may, upon execution, transmit the same commands to the platform code 406 as the functional code block 408. (Thus, both of the functional code blocks 408 and 410 are executable to update the state data of hidden component A). In this sense, the mimic component A1 can be deployed without extensive testing because the code invoked by mimic component A1 is identical to code already tested with respect to hidden component A. At the same time, the mimic component A1 may include style parameters that allow it to present its state data according to a look and feel that is different than that provided by style parameters included within the hidden UI component A1.

In one implementation, the mimic component A1 includes an observer that monitors state data of the UI component A on a continuous basis. When state data updates within the UI component A, the mimic component A1 pulls the updated state data from UI component A into itself and re-renders itself to the user display based on the newly-updated state data, similar to other figures described herein.

Figure 5:
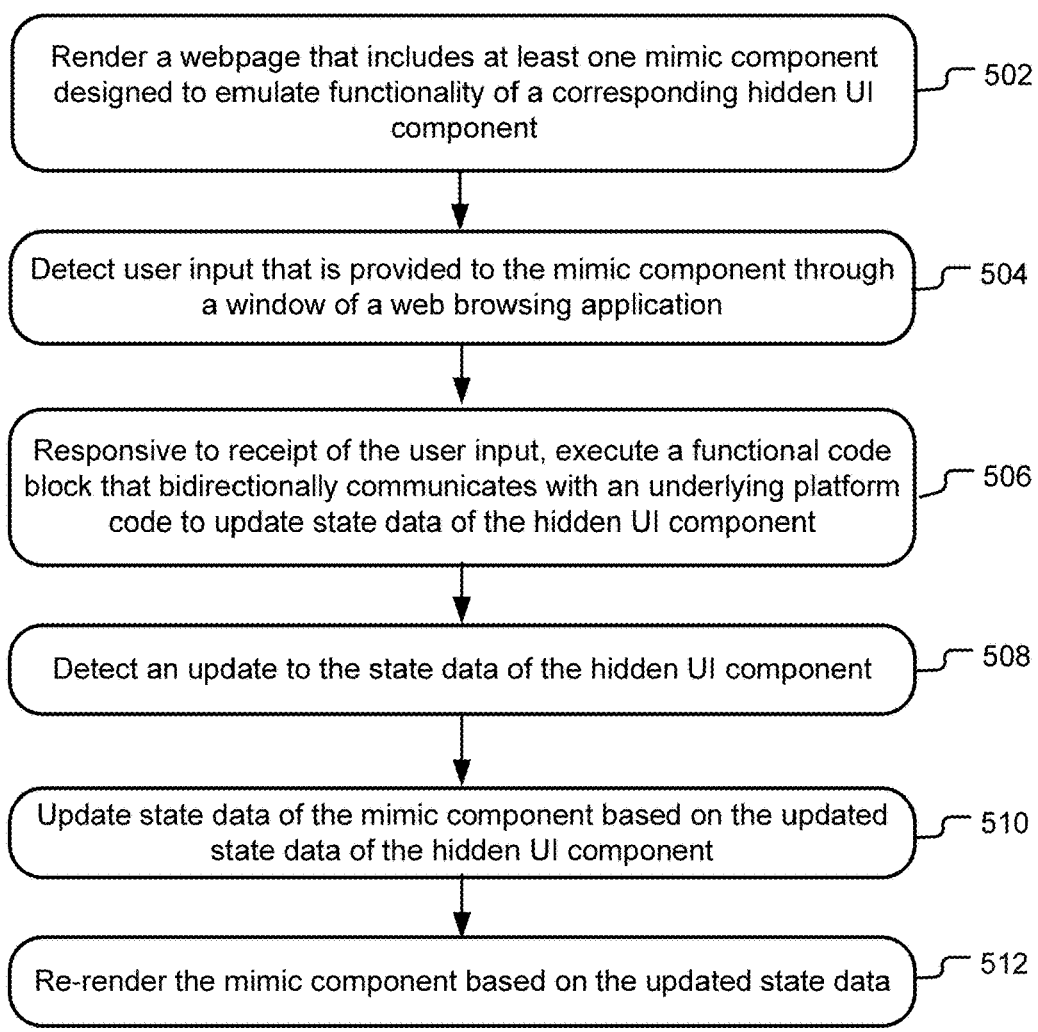
FIG. 5 illustrates a flowchart including example operations for using mimic components to deploy experimental features on an interactive webpage.

FIG. 5 illustrates a flowchart including example operations 500 for using mimic components to deploy experimental features on an interactive webpage. A rendering operation 502 renders a webpage to a user display. The webpage includes at least one hidden user interface (UI) component and a mimic component that is not hidden from the user display. The mimic component is configured to emulate a functionality of the hidden UI component.

A detection operation 504 detects user input provided to the mimic component. A code execution block 506 executes functional code in response to receipt of the user input at the mimic component. The execution of this functional code transmits commands to an underlying platform code. The underlying platform code receives the transmitted commands, executes the transmitted commands, and returns the state data to the hidden UI component.

A detection operation 508 detects an update to the state data of the hidden UI component. For example, the mimic component may include an observer that monitors the hidden UI component for updates.

A state data update operation 510 updates state data of the mimic component based on the updated state data of the hidden UI component. For example, the updated state data of the hidden UI component may be copied into the mimic component. A rendering operation 512 re-renders the mimic component based on the updated state data. For example, the mimic component may be re-rendered to present aspects of the state data from the hidden UI component according to a style that is uniquely defined within the mimic component.

Figure 6:
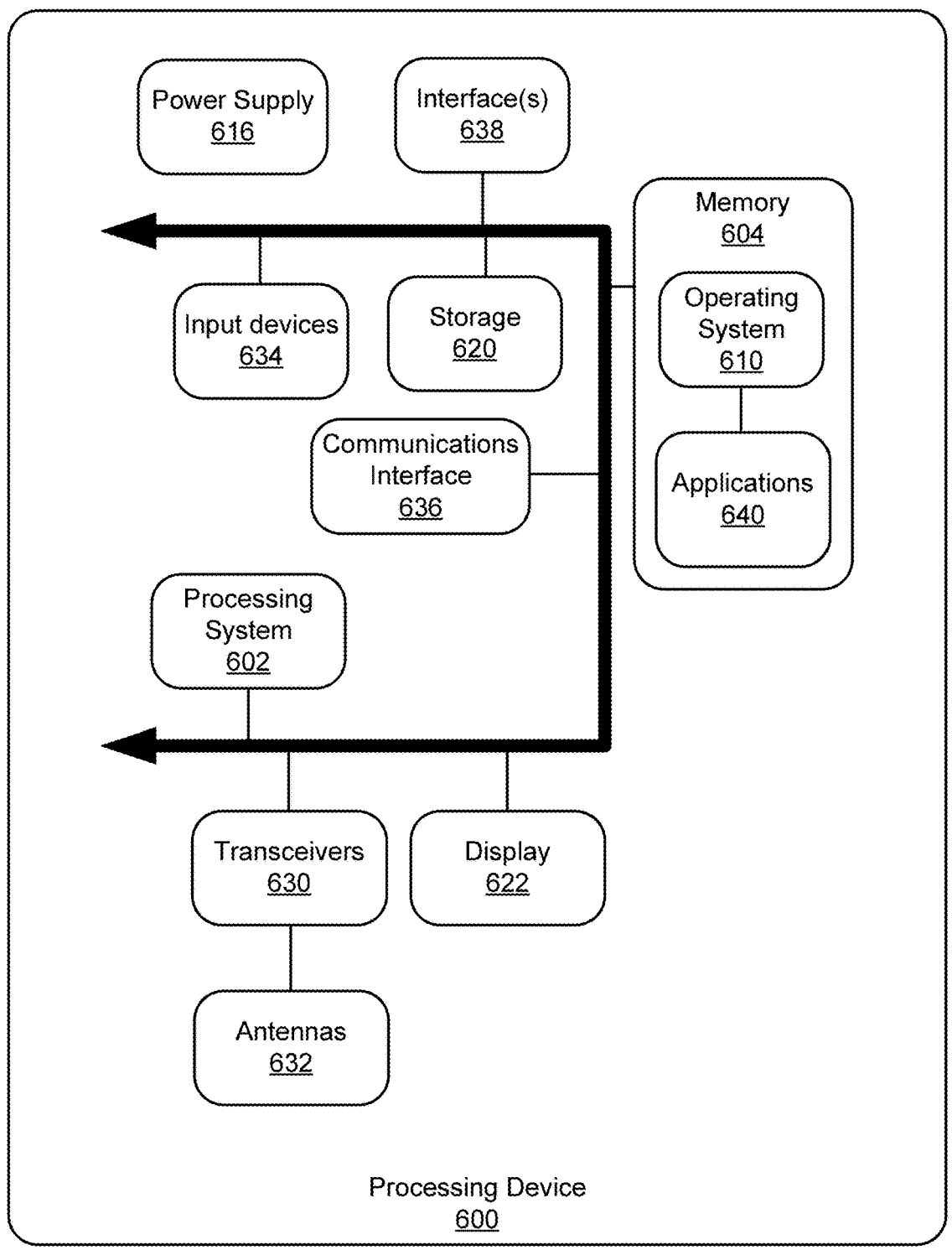
FIG. 6 illustrates an example schematic of a processing device that may be suitable for implementing aspects of the disclosed technology

FIG. 6 illustrates an example schematic of a processing device 600 that may be suitable for implementing aspects of the disclosed technology. The processing device 600 includes a processing system 602 (e.g., a CPU and a USB controller controller), memory 604, a display 622, and other interfaces 638 (e.g., buttons). The memory 604 generally includes both volatile memory (e.g., RAM) and non-volatile memory (e.g., flash memory). An operating system 610 resides in the memory 604 and is executed by the processing system 602, although it should be understood that other operating systems may be employed.

Applications 640, such as a web browser application, are loaded in the memory 604 and executed on the operating system 610 by the processing system 602. Applications 640 may receive input from various input local devices (not shown) such as a microphone, keypad, mouse, stylus, touchpad, joystick, etc. Additionally, the applications 640 may receive input from one or more remote devices, such as remotely-located smart devices, by communicating with such devices over a wired or wireless network using more communication transceivers 630 and an antenna 632 to provide network connectivity (e.g., a mobile phone network, Wi-Fi®, Bluetooth®). The processing device 600 further includes storage 620 and a power supply 616, which is powered by one or more batteries and/or other power sources and which provides power to other components of the processing device 600. The power supply 616 may also be connected to an external power source (not shown) that overrides or recharges the built-in batteries or other power sources.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes RAM, ROM, electrically erasable programmable read-only memory (EEPROM), flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example intangible communication signals include wired media such as a wired network or direct-wired connection, and wireless media such as acoustic, RF, infrared and other wireless media.

(A1) According to a first aspect, some implementations comprise a processor and a webpage stored in memory that defines a plurality of state-based components including a hidden user interface (UI) component and a mimic component. The hidden user interface (UI) component defines instructions executable by the processor to command an underlying platform code to perform one or more actions for updating state data of the hidden UI component. The mimic component emulates behavior of the hidden UI component and is configured to initialize an update to the state data of the hidden UI component in response to receipt of user input to the mimic component. The hidden UI component is also configured to update state data of the mimic component based on updated state data of the hidden UI component.

The system of A1 is advantageous because it allows a UI component to be deployed to user devices without undergoing a full development test cycle and without a decrease in the robusticity of the result code.

(A2) According to some implementations of A1, a user interaction with the mimic component triggers transmission of one or more commands to the underlying platform code that execute to update state data of the hidden UI component.

(A3) According to some implementations of A1, a user interaction with the mimic component simulates a user interaction with the hidden UI component. The user interaction with the mimic component invokes one or more function calls the underlying platform code effective to update state data of the hidden UI component.

(A4) According to some implementations of A1, the user interaction with the mimic component simulates a click on the hidden UI component.

The systems of A2-A4 are advantageous because they provide the user with functionality of the hidden UI component through the mimic component. The hidden UI component may be a robust code product subject to a thorough development cycle that the user interacts with through the mimic component. Thus, the mimic component can be subjected to less thorough testing without decreasing the reliability of the resulting code product.

(A5) According to some implementations of A1, the mimic component includes a first functional code block and the hidden UI component includes a second functional code block, the first functional code block and the second functional code block both being executable to update state data of the hidden UI component.

The system of A5 is advantageous because it may allow the mimic component to execute code that is identical to code already tested within the hidden UI component that is effective to update state data of the hidden UI component.

(A6) According to some implementation, the mimic component pulls the updated state data from the hidden UI component to update its own state.

(A7) According to some implementations, the mimic component includes an observer that monitors the hidden UI component for updates and wherein the mimic component self-updates using the state data of the hidden UI component when the observer detects an update to the hidden UI component The systems of A6 and A7 are advantageous because they allow the mimic component to serve the user with the functionality of the hidden UI component without having to independently perform actions for generating state data that is presented to the user.

(A8) In another aspect, some implementations include a method for deploying an experimental version of a webpage. The method includes operations that are described with respect to any of the systems disclosed herein (e.g., systems A1-A7).

In still another aspect, some implementations include computer-readable storage medium for storing computer-readable instructions. The computer-readable instructions are executable to implement any of the methods disclosed herein (e.g., method A8).

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A system comprising:
a processing system;
a webpage stored in memory, the webpage defining a plurality of state-based components including:
  a hidden user interface (UI) component defining instructions executable by the processing system to command an underlying platform code to perform one or more actions for updating state data of the hidden UI component; and
a mimic component that emulates behavior of the hidden UI component, the mimic component being a UI component configured to:

initialize an update to the state data of the hidden UI component in response to receipt of user input to the mimic component; and update state data of the mimic component based on the updated state data of the hidden UI component.

2. The system of claim 1, wherein a user interaction with the mimic component triggers transmission of one or more commands to the underlying platform code that execute and update the state data of the hidden UI component.

3. The system of claim 1, wherein a user interaction with the mimic component simulates a user interaction with the hidden UI component, the user interaction invoking one or more function calls to the underlying platform code effective to update the state data of the hidden UI component.

4. The system of claim 3, wherein the user interaction with the mimic component simulates a click on the hidden UI component.

5. The system of claim 1, wherein the mimic component includes a first functional code block and the hidden UI component includes a second functional code block, the first functional code block and the second functional code block both being executable to update the state data of the hidden UI component.

6. The system of claim 1, wherein the mimic component pulls the updated state data from the hidden UI component to update its own state.

7. The system of claim 6, wherein the mimic component includes an observer that monitors the hidden UI component for updates and wherein the mimic component self-updates using the state data of the hidden UI component when the observer detects an update to the hidden UI component.

8. One or more tangible computer-readable storage media encoding computer-executable instructions for executing a computer process to display an interactive webpage, the computer process comprising:

receiving a user input to a mimic component of the interactive webpage, the mimic component being adapted to emulate behavior of a hidden user interface (UI) component that is defined within the interactive webpage but not rendered to a user display;

executing, responsive to receipt of the user input at the mimic component, a functional code block that bidirectionally communicates with an underlying platform code to an update to state data of the hidden UI component; and updating state data of the mimic component based on the updated state data of the hidden UI component.

9. The one or more computer-readable storage media of claim 8, wherein the updated state data of the mimic component is copied over from the hidden UI component and wherein the mimic component defines a style element for presenting the updated state data that differs from a style element defined within the hidden UI component.

10. The one or more computer-readable storage media of claim 8, wherein the user input to the mimic component triggers transmission of one or more commands to an underlying platform code that execute to update state data of the hidden UI component.

11. The one or more computer-readable storage media of claim 8, wherein the user input to the mimic component simulates a user interaction with the hidden UI component.

12. The one or more computer-readable storage media of claim 8, wherein the user input to the mimic component simulates a click on the hidden UI component.

13. The one or more computer-readable storage media of claim 8, wherein the mimic component includes a first functional code block and the hidden UI component includes a second functional code block, the first functional code block and the second functional code block both being executable to update the state data of the hidden UI component.

14. The one or more computer-readable storage media of claim 8, wherein the mimic component pulls the updated state data from the hidden UI component to update its own state.

15. The one or more computer-readable storage media of claim 8, wherein the mimic component includes an observer that monitors the hidden UI component for updates and wherein the mimic component populates itself with the state data within the hidden UI component when the observer detects an update to the hidden UI component.

16. A method for deploying an experimental version of a webpage, the method comprising:

rendering a webpage to a user display, the webpage including at least one hidden user interface (UI) component and a mimic component that is not hidden from the user display, the mimic component being configured to emulate a functionality of the hidden UI component;

receiving user input to the mimic component through a web browser application window;

executing, by a processor and responsive to receipt of the user input to the mimic component, a functional code block that bidirectionally communicates with an underlying platform code to generate updated state data for the hidden UI component;

detecting an update to the state data of the hidden UI component; and responsive to the detection of the update to the state data of the hidden UI component, updating state data of the mimic component based on the updated state data of the hidden UI component.

17. The method of claim 16, wherein the user input to the mimic component triggers transmission of one or more commands to an underlying platform code that execute to generate the updated state data for hidden UI component and to transmit the updated state data back to the hidden UI component.

18. The method of claim 16, wherein the user input to the mimic component simulates a user interaction with the hidden UI component.

19. The method of claim 16, wherein the mimic component includes an observer that monitors the hidden UI component for updates and wherein the mimic component pulls the state data from the hidden UI component into itself when the observer detects an update to the hidden UI component.

20. The method of claim 16, wherein the mimic component pulls the updated state data from the hidden UI component to update its own state and re-renders itself in response to the update to its own state.

* * * * *